United States Patent

Klostermann

[15] 3,650,409
[45] Mar. 21, 1972

[54] APPARATUS FOR UNLOADING CONVEYED BOOKS

[72] Inventor: Heinz Klostermann, Wehdem, Germany

[73] Assignee: Rahdener Maschinenfabrik August Kolbus, Rahden, Germany

[22] Filed: Sept. 30, 1970

[21] Appl. No.: 76,951

[30] Foreign Application Priority Data

Oct. 4, 1969 Germany..................P 19 50 186.1

[52] U.S. Cl. ......................................214/1 QA, 198/33 AD
[51] Int. Cl. ..........................................................B65g 29/00
[58] Field of Search.................214/130 R, 1 QA, 1 Q, 1 QG; 198/33 AD

[56] References Cited

UNITED STATES PATENTS 3,160,291 12/1964 Thorp......................................214/1 Q
3,490,612 11/1970 Webers et al......................214/1 QA X Primary Examiner—Gerald M. Forlenza
Assistant Examiner—Frank E. Werner
Attorney—Michael S. Striker

[57] ABSTRACT

Books conveyed by a conveyor are unloaded by a pair of pockets having common inner lateral wall means and bottom means, and outer lateral wall means which are mounted for independent movement on the bottom means. During operation, one of the pockets is moved transversely to the conveyor movement from a receiving position receiving a book to a holding position for removing a book from the conveyor, while the respective other pocket assumes the receiving position whereupon the outer wall means of the pocket in the holding position is moved further to a horizontal or downwardly inclined position for transferring the books by a transfer rake to a conveyor of two other conveyors respectively cooperating with the two outer movable wall means.

14 Claims, 3 Drawing Figures

3,650,409

APPARATUS FOR UNLOADING CONVEYED BOOKS

BACKGROUND OF THE INVENTION

The present invention is concerned with apparatus for unloading a conveyor which carries books or uncased books. Apparatus serving this purpose is known by which the books are deposited in the same position in which they reach the unloading station.

SUMMARY OF THE INVENTION

It is one object of the invention to improve the known unloading apparatus for bookbinding machines.

Another object of the invention is to provide an unloading apparatus which operates with great efficiency and unloads a great number of books within a comparatively small period of time.

Another object of the invention is to provide an unloading apparatus for books in which the books or uncased books are operated and displaced without any damage.

With these objects in view an embodiment of the invention comprises conveyor means for transporting a row of books aligned in a vertical plane successively to an unloading position; at least one unloading pocket means including a bottom means and first and second lateral means, the pocket means being mounted for angular movement about a first axis located in the vertical plane to and from an upright receiving position in which the first and second lateral means are located on opposite sides of the vertical plane and of the book in the unloading position; means mounting the second lateral means on the bottom means turnable about a second axis parallel to the first axis; first operating means, preferably including cam means, for turning the pocket means with the second lateral means leading about the first axis from the receiving position to an upwards slanted holding position in which the first and second lateral means are located on the same side of the vertical plane and the book rests on the second lateral means; and second operating means for turning the second lateral means about the second axis away from the first lateral means to a transfer position supporting the book for transfer.

In a preferred embodiment, the second lateral means includes a holding rake which is downwardly and outwardly inclined in the transfer position, and cooperates with a transfer rake which moves from a position below the holding rake to a vertical position whereby the book is turned to a vertical position an angle of 180° displaced from its initial unloading position, and can be placed on another conveyor in this position.

Due to the fact that the book at the end of the operation is supported only by the holding rake in the downwardly inclined position, the operational speed of the apparatus can be substantially increased, as compared with the prior art since during the movement of the holding rake from the holding position to the transfer position, the other parts of the pocket can return to the initial receiving position for receiving another book. Furthermore, the effective inertia forces of the moving masses are substantially reduced due to the fact that only the holding rake moves at the end of the operation. Due to this fact the span of life of the apparatus is increased.

Another advantage is that by the operation of the transfer rake, the book is reversed as compared with its initial position on the conveyor. The automatic continuation of the movement of the holding rake to a downwardly slanted transfer position assures that the transfer rake which passes between the prongs of the holding rake and takes the book, can move the book without any contact with the other parts of the pocket means to the desired delivery position in which the book is taken by another conveyor and transported to another operating station so that a continuous sequence of operations can be carried out on the books handled by the apparatus of the invention.

In the preferred embodiment of the invention, two pocket means are provided which have inner adjacent lateral walls, and outer lateral walls which are independently turnable from the respective holding positions of the two pockets to transfer positions so that alternately delivered books can be alternately placed on two conveyors by the aid of two transfer rakes cooperating with the outer lateral walls which are also formed as holding rakes. The provision of two pockets further increases the output of the apparatus, and particularly if the inner interconnected wall means are connected by adjustable means and can be adjusted, books of very different formats can be handled by the apparatus.

First operating means including cam means are provided for turning the first and second pocket means together, and second operating means, including cam means, are provided for turning the outer lateral walls or holding rakes to the transfer positions independently of the movement of the pocket means by the first operating means. Third operating means, preferably including cam means, are provided for operating the transfer rake in synchronism with the movements of the holding rake of the pocket means, and all cams are driven from the same drive means to assure synchronism and the proper sequence of the operation.

In the preferred embodiment of the invention, the receiving positions of the two pocket means are spaced substantially 60°, and the holding rake in the extreme transfer position is spaced substantially 90° from the vertical plane in which the books are delivered in the unloading position by the conveyor means.

The conveyor means has vertical addle plates supporting the books in the vertical plane, and the conveyor belt on which the saddle plates are mounted through radial slots in the bottom means of the pockets to permit transverse unloading book in the unloading position.

First and second shaft means are mounted on the bottom means for supporting the two outer lateral holding rakes of the two pocket means, and these first and second shafts are angularly spaced an angle of substantially 120° about the axis about which the two pocket means turn.

The novel features which are considered as characteristic for the invention are set forth in particular in the appended claims. The invention itself, however, both as to its construction and its method of operation together with additional objects and advantages thereof will be best understood from the following description of specific embodiments when read in connection with the accompanying drawing.

DESCRIPTION OF THE PREFERRED EMBODIMENTS

Figure 1:
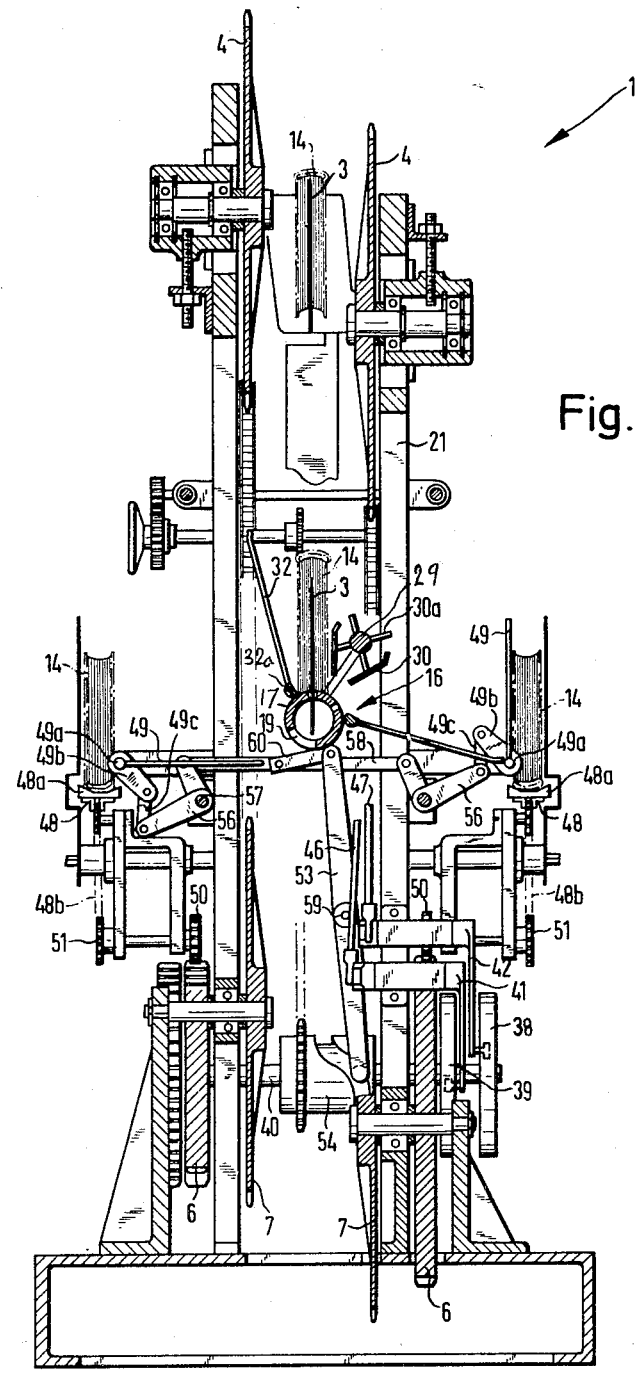
FIG. 1 is a front view, partially in vertical section, illustrating a casing-in machine provided with an unloading apparatus according to a preferred embodiment of the invention.
Figure 2:
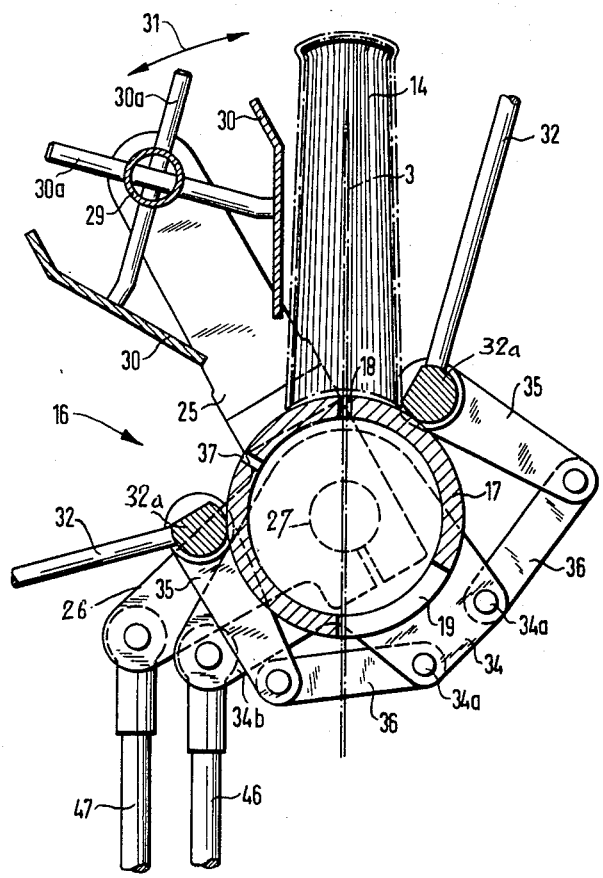
FIG. 2 is a fragmentary vertical sectional front view of the embodiment of FIG. 1 illustrating the same on an enlarged scale.
Figure 3:
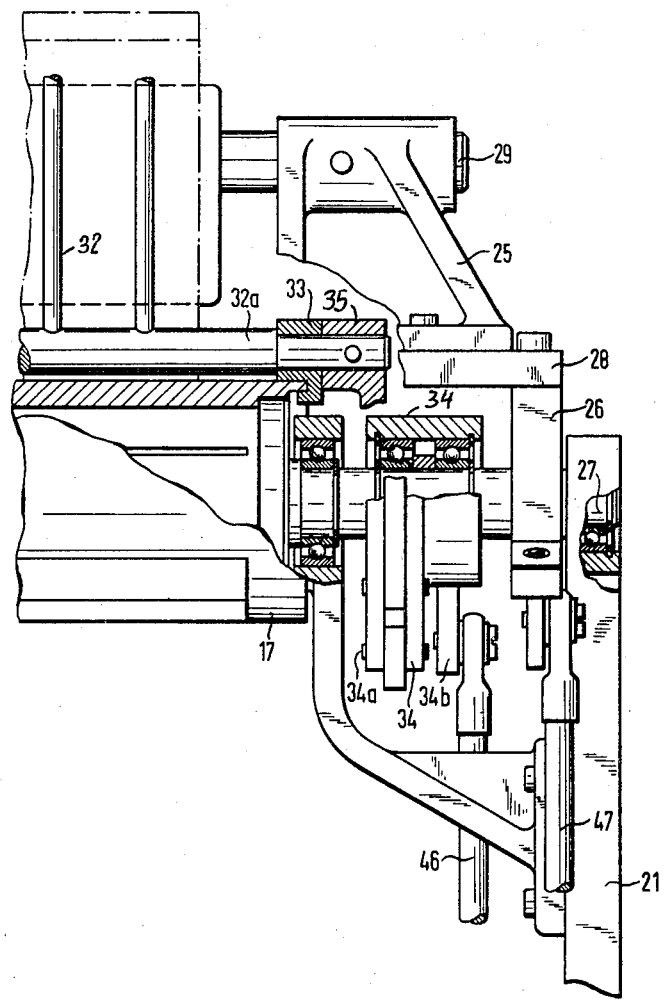
FIG. 3 is a fragmentary side view, partially broken off and in vertical section, illustrating the unloading apparatus shown in FIGS. 1 and 2.

As shown in FIG. 1, a drive shaft 40 drives two gears 6 which are connected with drive disks 7 for moving an endless belt over other reversing disks 4 along an endless path. The conveyor belt carries spaced saddle plates 3, see FIG. 2, on which books 14 are supported, each saddle plate 3 projecting upwardly between the pages of the book or of an uncased book 14. While the books are transported along a horizontal path, they pass through gluing stations, not shown, in which on the end papers of the uncased books, glue is applied, whereupon the uncased books are moved through a casing station in which each uncased book is pressed into the rounded back of a book cover and conveyed through a pressing station operating at the same speed as the conveyor where the book cover is pressed by rollers against the glued end papers of the uncased book. Thereupon, the deflecting disks 4 cause a downward movement of the saddle plates with the books 14, and during this movement, the leading book rests on the tubular wall 17 and assumes an unloading position since the respective saddle plate 3 moves through a slot 18 and a cutout 19 in the tubular wall 17, as is best seen in FIG. 2. The tubular wall 17 is part of an unloading station in which the conveyed books 14 are alternately unloaded in opposite transverse directions.

The tubular cylindrical wall 17 is mounted on a support shaft 27 fixedly secured to the same. Support shaft is rotatable in bearings mounted in the frame of the machine. The upper part of the tubular wall 17 is provided with slots 18 and 37 which are parallel to the axis of the tubular member 17. The two radial slots 18 and 37 permit the downward passage of the saddle plates 3 in two angularly displaced receiving positions of the tubular wall 17. The angle between slots 18 and 37 is preferably about 60°. The lower part of the tubular wall 17 is provided with a cutout 19 which extends in circumferential direction over an angle of 60° so that the saddle plates can cross the entire tubular wall 17.

The tubular wall 17 forms the bottom of two receiving and transferring pockets which are formed by inner first lateral wall means 30, and by outer second lateral rake means 32. Walls 30 and rakes 32 extend substantially in radial direction with respect to the axis of support shaft 27, and turn with the same. The wall 30 are respectively mounted on crossing rods 30a which penetrate the tubular shaft 29 which is mounted on an arm 25 which is connected by a plate 28 with a support 26 secured to shaft 27. A linking rod 47 is pivotally connected with support 26 and connected by an intermediate lever 42 and a cam follower portion of the same, with a rotary cam 38 so that the tubular wall 17 and arm means 25 with adjusting shaft 29 can be turned an angle of 60° in the directions indicated by the arrow 31, so that when a pocket is placed in the tilted holding position spaced 60° from the vertical receiving position, the book rests on the respective rake 32.

In the receiving position the respective wall 30 is substantially vertical, and the corresponding rake 32 is steeply upwardly slanted as shown for the right-hand pocket in FIGS. 2, and for the left-hand pocket in FIG. 1 In order to have both walls 30 substantially parallel to the vertical plane in which the book is transported, plates 30 are slanted to each other about 60°. The exact position of wall 30 can be adjusted by adjusting the rods 30a in the bores of the hollow adjusting shaft 29. The upper edge portion of walls 30 are slightly bent and extend substantially parallel to a radial plane passing through the axes of shafts 29 and 27.

Each rake 32 is secured to shaft means 32a which are mounted in bearings 33 at the ends of the tubular wall 17 symmetrically to the radial plane which passes through the axes of shafts 29 and 27. The shafts 32a are spaced from each other an angle of 120°. Lever arms 35 are secured to the shafts 32a and have free ends connected with links 36 which are pivotally connected at the other ends thereof to a lever arm 34 by pivots 34a. Pivots 34a are circumferentially spaced along an imaginary circle having the center in the axis of shaft 27. The lever arm 34 is turnable on the shaft 27 and forms an angular lever at whose second arm 34b a link is connected which by means of a cam follower lever 41 cooperates with a cam 39. The cam track of cam 39 by which the rakes 32 are operated is so designed that any rake 32 can move further downward to the slight downwardly slanted transfer position shown on the left side of FIG. 2, while the correlated wall 30 of the respective pocket is still spaced 60° from the vertical plane passing through the axis of shaft 27. In FIG. 1, the rake 32 of the right-hand pocket is shown in the downwardly slanted transfer position. Both cams 38 and 39 are driven by a shaft 40 which also drives the conveyor means with the saddle plates 3 so that all movements takes place in synchronism.

On either side of the machine, rotary transfer rakes 49 are mounted which are, respectively, located below one or the other holding rake 32 in a substantially horizontal position, so that the prongs of the transfer rakes 49 pass through the spaces between the prongs of the respective holding rakes 32.

When a transfer rake 49 is turned from a position located below a holding rake 32 with the book thereon, and is turned to a vertical position, the book is lifted off the respective holding rake 32 and turned to a vertical position, as shown in FIG. 1 on the right side.

The shafts 49a of the rakes 49 are connected by links 49c with angular levers 56 which are angularly displaceable about a pivot 57 in the frame 21, and have arms pivotally connected with the horizontal control rod 58 which is shiftable in horizontal direction between two positions. Since both levers 56 are connected with the control rod 58, the transfer rakes 49 are alternately operated when control rod 58 is shifted. A double-armed lever 53 pivotally mounted at 59 has an upper end connected by a link 60 to the horizontal control rod 58, and the lower end of lever 53 has a cam follower portion cooperating with a cam 54 which is secured to drive shaft 40. Cam 54 is a drum with a cam groove, so that the control rod is positively shifted in both directions for alternately placing the transfer rakes 49 in the horizontal transfer position, and in the vertical position in which the respective book is placed on a conveyor 48. Conveyors 48 move parallel to the shafts 49a of the transfer rakes 49 in planes parallel to the vertical plane through the axis of shaft 27. Each book is engaged by a projection 48a which has a shape corresponding to the back of the book, are mounted on an endless flexible belt 48b which is driven by a drive wheel 51 on whose shaft a gear 50 is mounted meshing with the gear 6 which also transmits the torque of drive shaft 40 to drive disks 7 of the saddle plate conveyor. Corresponding deflecting disks 4 are provided in the upper part of the machine for guiding the conveyor.

Adjusting spindles 52 are provided for adjusting the conveyors 48 to books of different thickness.

The apparatus operates as follows.

A book 14 is transported on its saddle plate 3 until it arrives in an unloading position located in one of the pockets formed by holding rakes 32, the plates 30, and the upper portion of the tubular member 17. In this position, the conveyor guides the saddle plate in downward direction so that the saddle plate 3 passes through the respective slot 18 or 37, depending on the angular position of the tubular wall 17 and of the two pockets. As soon as the upper edge of the respective saddle plate has passed through one of the slots, for example slot 37, the tubular wall 17 is turned in counterclockwise direction an angle of 60° together with shaft 29, walls 30, and rakes 32 so that the respective plate 30 tilts the book so that the same rests on the respective holding rake 32 in a holding position which is not shown in the drawing.

Thereupon, the cam track of cam 39 causes further movement of the holding rake 32 to a transfer position in which the rake 32 on the right of FIG. 1 is shown. The book resting on the respective holding rake is moved downward to a position displaced over 90° from its initial unloading position in the vertical plane of the axis of shaft 27.

The transfer rake 49 is now turned from its horizontal position located below the holding rake 32 to a vertical position while its prongs, passing through the spaces between the prongs of the holding rake 32, lift the book off the holding rake 32 and turn the same to the vertical position shown on the right side of FIG. 1 on which the back of the book is at the lower end of the book so that the book is reversed an angle of 180°, and rests on conveyor 48 by which the books are transported to another operating station.

While tubular wall 17 and the pockets were tilted 60°, with the left pocket in the holding position, the book 14 is conveyed to the unloading position located in the right-hand pocket, and during the return of the left-hand holding rake 32 and of tubular wall 17 with walls 30, this book is placed on the right side of the machine by the respective holding rake 32 where the book is moved by the transfer rake to the vertical position on conveyor 48.

If a book is in the position of FIG. 2, the bottom wall 17 is turned 60° to the right after the saddle plate 3 has moved downwards trough slot 18 and cutout 19. Arm 25 with both walls 30 turns 60°, and the respective shaft 32a also moves 60°. The book is therefore tilted substantially 60° and rests on rake 32 now displaced on the right side of FIG. 2 which is operated under the control of cam 39 to move further downward to the position in which the left-hand rake 32 is shown in FIG. 2, with the book resting thereon. In this downwardly slanting position, rake 32 is located in the region of the transfer rake 49 which has been placed in its lower horizontal position, so that turning of the transfer rake 49 lifts the book off the holding rake 32 on the right side of FIG. 2 and places the book on conveyor 48.

When the pockets were turned 60° in clockwise direction out of the position of FIG. 2, the left wall 30 is placed in a position as shown on the right side of FIG. 1, so that the book can be again inserted into the left respective pocket as in FIG. 1.

Due to the fact that the holding rakes 32 move independently of the walls 30 and of the tubular bottom wall 17, the time during which the book is carried by a holding rake 32, can be used for inserting another book 14 into the respective other pocket.

It will be understood that each of the elements described above, or two or more together, may also find a useful application in other types of apparatus for unloading conveyed books differing from the types described above.

While the invention has been illustrated and described as embodied in an apparatus including two pockets having independently movable holding means for the books, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that from the standpoint of prior art fairly constitute essential characteristics of the generic or specific aspects of this invention and, therefore, such adaptations should and are intended to be comprehended with the meaning and range of equivalence of the following claims.

What is claimed as new and desired to be protected by Letters Patent is set forth in the appended claims.

I claim:

1. Apparatus for unloading conveyed books, comprising conveyor means for transporting a row of books aligned in a vertical plane successively to an unloading position; at least one unloading pocket means including a bottom means and first and second lateral means, said pocket means being mounted for angular movement about a first axis located in said vertical plane to and from an upright receiving position in which said first and second lateral means are located on opposite sides of said vertical plane and of a book in said unloading position; means mounting said second lateral means on said bottom means turnable about a second axis parallel to said first axis; first operating means for turning said pocket means, with said second lateral means leading, about said first axis, from said receiving position to an upward slanted holding position in which said first and second lateral means are located on the same side of said vertical plane and the book rests on said second lateral means; and second operating means for turning said second lateral means about said second axis away from said first lateral means to a transfer position supporting the book for transfer.

2. Apparatus as claimed in claim 1 wherein said second lateral means includes a holding rake with first prongs and spaces between said first prongs; and further comprising a transfer rake having second prongs, and being turnable about an axis parallel to said vertical plane from a position below said holding rake in said transfer position to a vertical position with said second prongs moving through the spaces between said first prongs so that the book is turned by said transfer rake to a vertical position in which said second lateral means is free to be turned back by said second operating means; and third operating means for actuating said transfer rake in synchronism with the movements of said second lateral means by said second operating means.

3. Apparatus as claimed in claim 2 including a conveyor receiving books turned by said transfer rake to said vertical position for transporting the same away from said transfer rake and pocket means.

4. Apparatus for unloading conveyed books, comprising conveyor means for transporting a row of books aligned in a vertical plane successively to an unloading position; first and second adjacent unloading pocket means, having common bottom means and first lateral means, and each pocket means having second lateral means outward of said common first lateral means, said first and second unloading pocket means being mounted for angular movement about a first axis located in said vertical plane and to and from two upright receiving positions in which said first and the respective second lateral means of one or the other of said first and second pocket means are located on opposite sides of said vertical plane, respectively, and also of a book in said unloading position, said two second lateral means being mounted on said bottom means turnable about two second axes parallel to said first axis and located on opposite sides of said vertical plane; first operating means for turning said first and second pocket means together, with one of said second lateral means leading, about said first axis in two opposite directions from the respective receiving position to two upward slanted holding positions, respectively, in which said first and the respective second lateral means are both located on opposite sides of said vertical plane, respectively, and the book rests on the respective second lateral means; and second operating means for turning said second lateral means of the pocket means in said holding position about the respective second axis away from said first lateral means to a transfer position supporting a book for transfer, said first and second operating means operating in a timed sequence so that said first and second pocket means are alternately in said receiving position for receiving a book while the second lateral means of the respective other pocket means moves with another book from said holding position to said transfer position.

5. Apparatus as claimed in claim 4 wherein said first lateral means include two plates forming the inner walls of said first and second pocket means, crossing rods respectively supporting said two plates, and an adjusting shaft crossed by said rods so that the relative position of said plates can be adjusted, and being turnably mounted on said bottom means for angularly adjusting the position of said two plates relative to said second lateral means of said first and second pocket means.

6. Apparatus as claimed in claim 5 further comprising a support shaft having said first axis and being mounted for turning movement about the same; wherein said bottom means are fixedly secured to said support shaft, and include arm means supporting said adjusting shaft; and wherein said first operating means includes first rotary driven cam means, and a first cam follower linkage connecting said first cam means with said bottom means for turning the same and said arms means with said adjusting rod and plates substantially 60° between said receiving position and each of said holding positions.

7. Apparatus as claimed in claim 6 wherein each of said first and second pocket means in said receiving position has the respective plate of said first lateral means located substantially in a vertical plane parallel to said vertical plane, while the respective second lateral means defines with the respective plate an acute angle having its apex in the proximity of said first axis.

8. Apparatus as claimed in claim 7 further comprising first and second shaft means having said second axes and being mounted on said bottom means on opposite sides of a plane passing through said adjusting shaft and said first axis, and wherein the two second lateral means are mounted on said first and second shaft means, respectively; and wherein said second operating means include second rotary driven cam means and a second cam follower linkage connecting said second cam means with said first and second shaft means so that the same are turned from said receiving position to said transfer position an angle of substantially 90°.

9. Apparatus as claimed in claim 8 wherein said second cam follower linkage includes a lever arm fixedly secured to said support shaft, a pair of links having first ends, two pivots connecting said first ends with said lever arm and being located on a circle concentric with said first axis, and a pair of arms respectively secured to said first and second shafts means, and pivotally connected with the second ends of said links.

10. Apparatus as claimed in claim 8 wherein said first and second shaft means are spaced an angle of substantially 120° about said first axis; and wherein a plane passing through said adjusting shaft and said first axis substantially halves said angle of 120°.

11. Apparatus as claimed in claim 4 wherein each of said second lateral means includes a holding rake with first prongs; and further comprising two transfer rakes having second prongs and respectively cooperating with said holding rakes; transfer shafts supporting said transfer rakes for turning movement about axes parallel with said first and second axis from positions below said holding rakes in said transfer position to vertical positions with said second prongs moving through the spaces between said first prongs so that the book thereon is turned to a vertical position in which said holding rakes are free to be turned back to said receiving position by said second operating means; a pair of linkages having first ends connected with said transfer shafts; and third operating means including rotary cam means and cam follower means connected with the second ends of both said linkages for turning said transfer shafts in synchronism with the movements of said holding rakes by said second operating means.

12. Apparatus as claimed in claim 4 wherein said bottom means includes a cylindrical wall concentric with said first axis and formed with slots located in axial planes spaced an angle corresponding to the angular distance between said two receiving positions of said first and second pocket means; and wherein said conveyor means include a conveyor belt and saddle plates on said conveyor belt located in said vertical plane and located between pages of conveyor books whose backs are located above the upper edges of said saddle plates; and wherein said conveyor belt moves said saddle plates into alignment with said slots and downward through said slots so that each book rests in said unloading position on said cylindrical wall in said receiving positions of the respective pocket means.

13. Apparatus as claimed in claimed in claim 12 wherein said first and second pocket means move angles of 60° between said receiving positions; and wherein said slots are spaced an angle of 60°.

14. Apparatus as claimed in claim 13 wherein said cylindrical wall of said bottom means is turnable about said first axis and has an outer cylindrical peripheral surface on which the book rests in said unloading position when the respective saddle plate has moved downward out of the book; wherein the upper portion of said of said cylindrical wall is formed with two radial slots for the passage of said saddle plates; and wherein the lower portion of said cylindrical wall is formed with a cutout positioned diametrically to said two radial slots and permitting downward movement of said saddle plates out of said tubular member, said slots and the circumferential extremities of said cutout being spaced an angle of substantially 60°.

* * * * *